United States Patent [19]

Hildebrecht

[11] 4,106,362

[45] Aug. 15, 1978

[54] CONTROL LINKAGE FOR TORQUE CONVERTER TRANSMISSION OR THE LIKE

[75] Inventor: Harold V. Hildebrecht, Cleveland, Ohio

[73] Assignee: Towmotor Corporation, Mentor, Ohio

[21] Appl. No.: 768,119

[22] Filed: Feb. 14, 1977

[51] Int. Cl.$^2$ .......................... G05G 1/14; G05G 7/06
[52] U.S. Cl. ...................................... 74/474; 74/143; 74/512; 74/560
[58] Field of Search .................... 74/141.5, 142, 143, 74/474, 512, 560, 473 R, 475, 478

[56] References Cited

U.S. PATENT DOCUMENTS

| 2,474,656 | 6/1949 | Claus | 74/142 |
| 2,498,914 | 2/1950 | Correll | 74/474 |
| 3,665,775 | 5/1972 | Freeman | 74/142 |
| 3,800,614 | 4/1974 | Johnson | 74/143 X |
| 3,874,248 | 4/1975 | Hauser et al. | 74/143 X |
| 3,941,008 | 3/1976 | Cambria | 74/143 X |

FOREIGN PATENT DOCUMENTS 765,383  3/1934  France ...................................... 74/474

Primary Examiner—Allan D. Hermann

Attorney, Agent, or Firm—Wegner, Stellman, McCord, Wiles & Wood

[57] ABSTRACT

A control linkage including an actuator mounted for movement between first and second extreme positions and an intermediate position between the extreme positions, springs for restoring the actuator to the intermediate position from either extreme position upon release of the actuator by an operator thereof, a multiple-toothed member adapted to be connected to a mechanism to be controlled by the linkage, the member being mounted for shifting movement between at least three positions, an element having a nose and mounted for selective engagement with the teeth on the toothed member to shift the toothed member between the three positions thereof, the teeth and the nose being constructed and arranged so that the nose may be cammed out of effective engagement with the teeth upon relative movement between the element and the member and a linkage interconnecting the actuator and the element for moving the nose in opposite directions when the actuator is moved to or from its intermediate position from or to its extreme position and for positively engaging the nose and the teeth when the actuator is moved from its intermediate position to either of its extreme positions and allowing the nose to be cammed out of effective engagement with the teeth when the actuator is moved from either of its extreme positions to its intermediate position.

10 Claims, 2 Drawing Figures

CONTROL LINKAGE FOR TORQUE CONVERTER TRANSMISSION OR THE LIKE

BACKGROUND OF THE INVENTION

This invention relates to control linkages and, more specifically, to control linkages for transmissions such as torque converter transmissions used in lift trucks or the like.

There are a variety of potential uses for control linkages of the indexing type wherein an element to be controlled must be moved, bi-directionally and serially, through a plurality of positions, one at a time, and wherein the manual actuator is restored to a particular position after each actuation, regardless of the one of many possible states of the mechanism to be controlled. A typical example is a torque converter transmission for a lift truck. Frequently, the transmission will be capable of plural forward speeds as well as plural reverse speeds and it is desirable that a change from one speed range to the other in the same direction, or the opposite direction, be accomplished in a stepwise fashion without the skipping of a speed range to minimize the number of actuators employed. In many cases, both a clutch actuator and a transmission actuator might be employed, requiring independent movement of two actuators by the operator.

In any event, many such systems in use today are extremely complex, either mechanically or electrically, or both, and a goodly number are not foolproof in terms of preventing an operator from skipping a speed range entirely.

There are, of course, a number of other uses which will occur to those skilled in the art, other than transmission control, wherein the control of mechanisms confronts the same problems.

SUMMARY OF THE INVENTION

The present invention is directed to overcoming one or more of the above problems.

According to the present invention, there is provided a control linkage including an actuator mounted for movement between first and second extreme positions and an intermediate position between the extreme positions. Means are provided for restoring the actuator to the intermediate position from either extreme position upon the release of the actuator by an operator thereof. The linkage includes a multiple-toothed member and an element having a nose for selective engagement with the teeth of the member. Means mount the member and the element for relative movements such that one of the member and the element may be connected to a mechanism to be controlled by the actuator. The teeth and the nose are constructed and arranged so that the teeth and nose may be cammed out of effective engagement with each other upon relative movement between the element and the member. Means, including a linkage, are provided for interconnecting the actuator and the other of the member and the element for (a) moving the other of the member and the element in opposite directions when the actuator is moved to or from its intermediate position from or to its extreme positions and (b) positively engaging the nose and the teeth when the actuator is moved from its intermediate position to either of its extreme positions while allowing the nose to be cammed out of effective engagement with the teeth when the actuator is moved from either of its extreme positions to its intermediate positions.

Other objects and advantages will become apparent from the following specification taken in connection with the accompanying drawings.

DESCRIPTION OF THE PREFERRED EMBODIMENT

Figure 1:
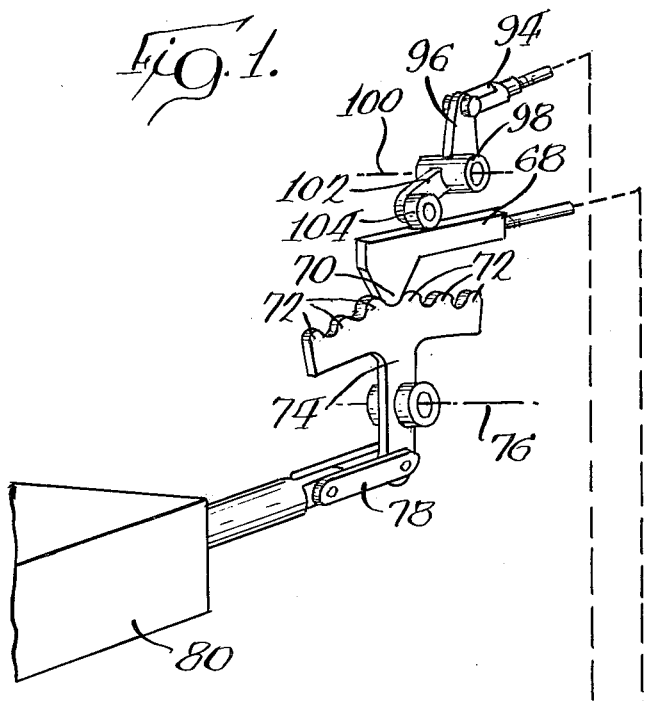
FIG. 1 is a perspective, somewhat schematic, view of a linkage embodying the invention.

The control linkage of the present invention is described in connection with the control of a transmission for a lift truck or the like. However, it is to be understood that its uses are not so limited and that other uses will occur to those skilled in the art.

The control linkage includes a generally V-shaped actuator 10 having a reverse pedal 12 mounted on one of its arms and a forward pedal 14 mounted on the other of its arms. The actuator 10 includes a sleeve 16 at its base by which it may be pivoted on an axis 18 to the vehicle frame by any suitable means. Springs 20 on opposite sides of the actuator 10 are interposed between the vehicle frame, shown schematically at 22, and corresponding ones of the arms of the actuator 10 for biasing the actuator 10 to the position illustrated whereat both of the pedals 12 and 14 will be at approximately the same height. The springs 20 also allow both counterclockwise and clockwise movement of the actuator 10 about the pivot axis 18 to extreme positions. When it is desired to shift the transmission to the reverse direction, the pedal 12 will be depressed one or more times against the bias of the spring 20. To select a forward speed range, the pedal 14 is similarly actuated.

Typically, an accelerator pedal 24 may be located between the pedals 12 and 14 for speed control and for convenience of the operator.

The sleeve 16 includes an arm 26 extending to the side thereof and a yoke 28 is pivotally secured to the end of the arm 26 remote from the sleeve 16. An L-shaped link 30 is secured to the yoke 28 and includes an end 32 received pivotally in the end of an arm 34 of a bell crank 36. The bell crank 36 includes a central sleeve 38 which may be pivoted to the vehicle frame by means of a pivot pin (not shown) so that the bell crank 36 may pivot about an axis 40 which will generally, but not necessarily, be transverse to the axis 18.

The bell crank 36 includes a further arm 42 in the form of a cam plate having a cam surface 44 provided with a central depression 46. The depression 46 will be aligned with and adapted to receive a cam follower 48 whenever the actuator 10 is in its intermediate position.

Figure 2:
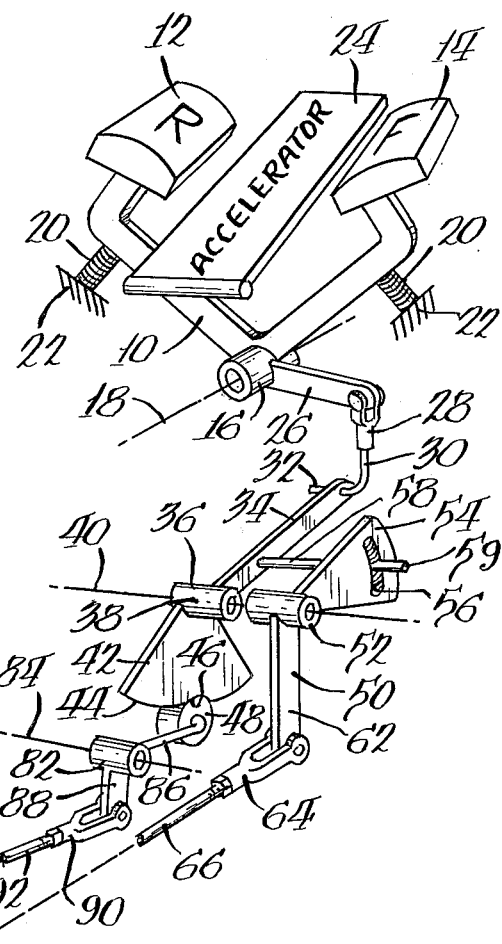
FIG. 2 is an enlarged, fragmentary view of a portion of the linkage.
Figure 2:
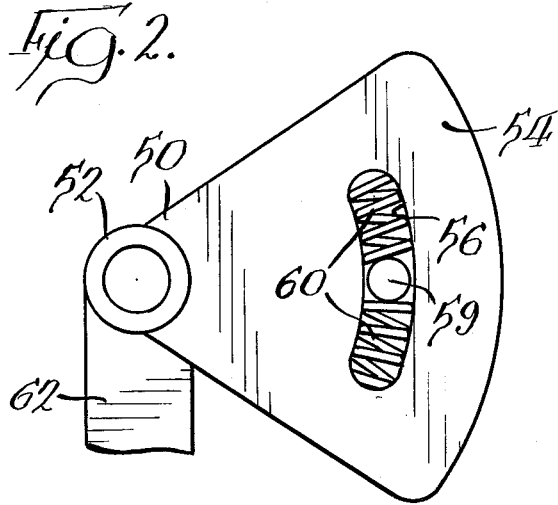

A bell crank 50 includes a sleeve 52 mounting the bell crank 50 for pivotal movement about the axis 40 in adjacency to the bell crank 36. One arm of the bell crank 50 comprises a plate 54 having an arcuate, closed ended slot 56 therein. A pin 58 is secured to the arm 34 of the bell crank 36 and has a portion 59 displaced from the pivot axis 40 but extending parallel thereto to be received within the slot 56. As best seen in FIG. 2, biasing springs 60 are interposed between opposite ends of the slot 56 and bear against the pin portion 59 for the purpose or urging the pin portion 59 to a position within the slot 56 intermediate the ends thereof. The components define a lost motion, self-centering connection.

The bell crank 50 includes a second arm 62 which is pivotally connected to a yoke 64 which actuates a mechanical linkage 66 of any suitable form. The linkage 66 extends to a shiftable element 68 having a nose 70. The nose 70 is selectively engageable with the sides of adjacent ones of teeth 72 formed in a member 74. As seen in FIG. 1, there are a multiplicity of the teeth 72 on the member 74. It is to be particularly observed that the sides of the teeth 72 as well as the projection of the nose 70 are rounded such that, upon relative movement between the element 68 and the member 74, if the nose is not firmly urged into the space between adjacent ones of the teeth 72, it will be cammed out of engagement therewith and moved to the next adjacent space between teeth 72, the direction of such movement to be described in greater detail hereinafter.

The member 74 is pivoted about a pivot axis 76 and includes a connection by means of a link 78 to a mechanism 80 to be controlled by the actuator 10. For example, the mechanism 80 may be a control valve having a valve member shiftable to a plurality of positions. Where the toothed member 74 is constructed as illustrated, utilizing six teeth, the valve member will typically be shiftable through five positions which, in a transmission system, could represent two forward speeds, a neutral position, and two reverse speeds. In the usual case, the element of the mechanism 80 to be shifted by the linkage will be internally detented. That is, some sort of means will be provided in connection with the mechanism 80 for holding the shiftable element as forming part thereof in any one of the five positions until a certain amount of shifting force is applied thereto through the linkage 78.

The control system further includes an additional bell crank 82 mounted for rotation about an axis 84 and having one arm 86 rotatably mounting the cam follower 48. Another arm 88 is pivotally connected to a yoke 90 and a linkage 92 of conventional construction extends from the yoke 90 to a yoke 94 which is pivotally connected to one arm 96 of a bell crank 98. The bell crank 98 is mounted for rotation about an axis 100 which is located above and transverse to the longitudinal axis of the nosed element 68. Another arm 102 of the bell crank 98 rotatably mounts a roller 104 which is in engagement with the nosed element 68 oppositely of the nose 70. Those skilled in the art will appreciate that when the bell crank 98 is moved counterclockwise about pivot axis 100, as viewed in FIG. 1, the roller 104 will apply a biasing force to the nosed element 68 to positively engage the nose 70 between the teeth 72. Conversely, when the bell crank is oppositely rotated so that no biasing force is applied to the element 68, by reason of the aforementioned configuration of the nose 70 and the teeth 72, relative motion between the element 68 and the member 74 will allow the nose 70 to be cammed out of engagement with the member 74. The latter will occur when the cam follower 68 is in the depression 46 on the cam 42. The former will occur whenever the cam 42 has been rotated from the position illustrated in FIG. 1 urging the follower 48 out of the depression 46.

Operation of the linkage is as follows. Depression of the pedal 12 will cause the arm 34 of the bell crank 36 to be elevated and the cam 42 to be rotated such that the cam follower 48 will be moved out of the depression 46 to ultimately apply a downward biasing force to the nosed element 68 and positively engage the nose 70 with the teeth 72. The upward movement of the arm 34 will raise the pin 58. At some point in time, the pin 58 will bottom out against the fully compressed spring 60 in the upper end of the slot 56 and continued upward movement of the arm 34 will then cause arm 54 of the bell crank 50 to also be moved upwardly and thereby pulling the nosed element 68 to the right as viewed in FIG. 1. Since the same is positively engaged with the toothed element 74, the latter will rotate in a clockwise direction an increment corresponding to a change of one position of the shiftable element of the mechanism 80 to be controlled. At such time, the pedal 12 will have bottomed out against the frame 22 of the vehicle or any suitable stop provided, preventing further movement. Release of the pedal 12 will then allow the cam 42 to resume the position illustrated in FIG. 1 with the follower 48 received in the depression 46 thereby releasing the bias applied to the nosed element 68. At this point in time, the pin 58 will have moved downwardly in the slot 56 of the plate 54 to compress the lower spring 60. However, the plate 54 will not have pivoted from its extreme position by reason of the retention of the same due to the internal detenting contained within the mechanism 80.

When the follower 48 is fully occupying the recess 46 in the cam 42, the bias will be released from the nose member 68 and the lower spring 60 will urge the pin 58 to a position intermediate the ends of the slot 56. This will, in turn, cause the arm 54 to rotate in a clockwise direction, as viewed in FIG. 1, to move the nosed member 68 from the position to which it has been previously moved to that illustrated in FIG. 1. Since no biasing force is applied to the latter during such movement, the nose 70 will simply cam itself out of engagement with the teeth 72 during such movement and occupy the next adjacent space.

A further depression of the pedal 12 will further advance the multi-toothed member 74 in the same direction. Depression of the pedal 14 will cause the same events to occur in the same sequence, but the nose member 68 will be urged to the left, as viewed in FIG. 1, rather than to the right.

From the foregoing, it will be appreciated that a control linkage made according to the invention provides for automatic return of the actuator 10 to a given position regardless of the state of the mechanism 80 to be controlled. It will also be appreciated that the mechanism is relatively simple, being wholly composed of mechanical parts that are not failure prone. It will also be appreciated that the linkage is foolproof in that a given control position cannot be intentionally skipped by an operator, it being necessary that each control position be traversed by reason of the control linkage indexing from one position to another, one at a time. This is particularly advantageous when a multi-speed transmission is being controlled in ensuring that the operator does not overload transmission by attempting to change directions too abruptly.

The embodiments of the invention in which an exclusive property or privilege is claimed are defined as follows:

1. A control linkage comprising:
    an actuator mounted for movement between first and second extreme positions and an intermediate position between said extreme positions;
    means for restoring said actuator to said intermediate position from either extreme position upon the release of said actuator by an operator thereof;
    a multiple-toothed member adapted to be connected to a mechanism to be controlled by said linkage;
    means mounting said toothed member for shifting movement between at least three positions;

an element having a rounded nose and mounted for selective engagement with the teeth on said toothed member to shift said member between said three positions;

said teeth and said nose being constructed and arranged so that said nose may be cammed out of effective engagement with said teeth upon relative movement between said element and said member; and means, including a linkage, interconnecting said actuator and said element for (a) moving said nose in opposite directions when said actuator is moved to or from its intermediate positions from or to its extreme positions, and (b) positively engaging said nose and said teeth when said actuator is moved from its intermediate position to either of its extreme positions and allowing said nose to be cammed out of effective engagement with said teeth when said actuator is moved from either of its extreme positions to its intermediate position.

2. A control linkage comprising:

an actuator mounted for movement between first and second extreme positions and an intermediate position between said extreme positions;

means for restoring said actuator to said intermediate position from either extreme position upon the release of said actuator by an operator thereof;

a multiple-toothed member adapted to be connected to a mechanism to be controlled by said linkage;

means mounting said toothed member for shifting movement between at least three positions;

an element having a nose and mounted for selective engagement with the teeth on said toothed member to shift said member between said three positions;

said teeth and said nose being constructed and arranged so that said nose may be cammed out of effective engagement with said teeth upon relative movement between said element and said member; and means, including a linkage, having a lost motion, self-centering connection, interconnecting said actuator and said element for (a) moving said nose in opposite directions when said actuator is moved to or from its intermediate positions from or to its extreme positions, and (b) positively engaging said nose and said teeth when said actuator is moved from its intermediate position to either of its extreme positions and allowing said nose to be cammed out of effective engagement with said teeth when said actuator is moved from either of its extreme positions to its intermediate position.

3. The control linkage of claim 2 wherein said lost motion, self-centering connection comprises a plate having a slot with opposed ends therein, a pin in said slot, and resilient means about said pin for biasing said pin towards a position intermediate the ends of said slot.

4. The control linkage of claim 3 wherein said actuator is pivotally mounted and said pin is carried by an arm pivoted by said actuators, said plate comprising a bell crank.

5. A control linkage comprising:

an actuator mounted for movement between first and second extreme positions and an intermediate position between said extreme positions;

means for restoring said actuator to said intermediate position from either extreme position upon the release of said actuator by an operator thereof;

a multiple-toothed member adapted to be connected to a mechanism to be controlled by said linkage;

means mounting said toothed member for shifting movement between at least three positions;

an element having a nose and mounted for selective engagement with the teeth on said toothed member to shift said member between said three positions;

said teeth and said nose being constructed and arranged so that said nose may be cammed out of effective engagement with said teeth upon relative movement between said element and said member; and means, including a linkage, interconnecting said actuator and said element for (a) moving said nose in opposite directions when said actuator is moved to or from its intermediate positions from or to its extreme positions, and (b) positively engaging said nose and said teeth when said actuator is moved from its intermediate position to either of its extreme positions and allowing said nose to be cammed out of effective engagement with said teeth when said actuator is moved from either of its extreme positions to its intermediate position, said linkage comprising a biasing linkage engageable with said element oppositely of said nose and a cam operated by said actuator for applying a biasing force to said element through said biasing linkage whenever said actuator is not in said intermediate position.

6. A control linkage comprising:

an actuator mounted for movement between first and second extreme positions and an intermediate position between said extreme positions;

means for restoring said actuator to said intermediate position from either extreme position upon the release of said actuator by an operator thereof;

a multiple-toothed member;

an element having a rounded nose for selective engagement with the teeth of said member;

means mounting said member and said element for relative movement such that one of said member and said element may be connected to a mechanism to be controlled by said actuator;

said teeth and said nose being constructed and arranged so that said nose and teeth may be cammed out of effective engagement with each other upon relative movement between said element and said member; and means, including a linkage, interconnecting said actuator and the other of said member and said element for (a) moving said other of said member and said element in opposite directions when said actuator is moved to or from its intermediate positions from or to its extreme positions, and (b) positively engaging said nose and said teeth when said actuator is moved from its intermediate position to either of its extreme positions and allowing said nose to be cammed out of effective engagement with said teeth when said actuator is moved from either of its extreme positions to its intermediate position.

7. A control linkage comprising:

a link pivotally mounted for rotation about an axis between two extreme positions and adapted to be connected to a manual actuator;

a pin on said link and having a portion displaced from said axis and extending generally parallel thereto;

a cam surface on said link;

an arm mounted for rotation about said axis in proximity to said link and having an arcuate, closed ended slot receiving said pin portion;

means on said arm for urging said pin portion toward a position intermediate the ends of said slot;

a movable member carrying a multiplicity of teeth;

a movable element carrying a nose engageable with said teeth;

one of said member and said element adapted to be connected to a mechanism to be controlled;

said nose and said teeth being constructed and arranged such that said nose and teeth may be cammed out of effective engagement with each other upon relative movement therebetween;

a cam follower in engagement with said cam;

biasing means operated by said cam follower for applying a force to said other of said element and said member to positively engage said nose and said teeth; and means interconnecting said arm and said other of said element and said member.

8. The control linkage of claim 7 wherein said link and said arm each comprise a bell crank.

9. The control linkage of claim 7 wherein said biasing means comprises a bell crank having a roller engaging said other of said member and said element oppositely of said teeth and said nose, respectively.

10. The control linkage of claim 7 further including a two-pedalled actuator connected to said link, said actuator being pivoted intermediate its ends; and spring means urging said actuator toward a position intermediate two extreme positions of movement thereof.

* * * * *